Figure 1:
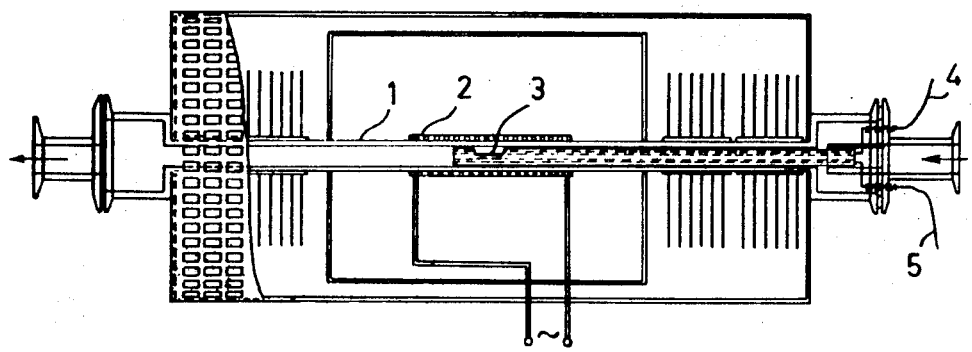

United States Patent

[11] 3,611,243

| [72] | Inventor | Karl Heinz Hardtl<br>Aachen, Germany |
|---|---|---|
| [21] | Appl. No. | 812,024 |
| [22] | Filed | Apr. 1, 1969 |
| [45] | Patented | Oct. 5, 1971 |
| [73] | Assignee | U. S. Philips Corporation<br>New York, N.Y. |
| [32] | Priority | Apr. 2, 1968 |
| [33] | | Germany |
| [31] | | P 17 73 110.1 |

[54] ELEMENT FOR THE DETERMINATION OF THE PARTIAL OXYGEN PRESSURE
2 Claims, 3 Drawing Figs.

[52] U.S. Cl. .................................................. 338/34,
73/23, 252/62.3 BT, 252/520
[51] Int. Cl. ....................................................... H01c 15/00
[50] Field of Search ............................................ 338/34, 36;
73/23; 252/62.3 BT, 520

[56] References Cited
UNITED STATES PATENTS
3,033,907  5/1962  Rue .............................. 252/62.3

OTHER REFERENCES
Hermann Schmalzried " Uher Zirkondioxyd als Elektrolyl fuer elektrochemische Untersachanger bei hoeheren Temperaturen" (1962) in Zeitschrift fuer Elektrochemishe 66 pp. 572–576

Primary Examiner—Rodney D. Bennett, Jr.
Assistant Examiner—R. Kinberg
Attorney—Frank R. Trifari ABSTRACT: An apparatus for determining partial oxygen pressure in a gas mixture by the measurement of electrical conductivity of titanium dioxide doped to have N-type conductivity and exposed to the gas.

PATENTED OCT 5 1971

3,611,243

SHEET 1 OF 2

INVENTOR.
KARL H. HÄRDTL

BY

AGENT

ELEMENT FOR THE DETERMINATION OF THE PARTIAL OXYGEN PRESSURE

The invention relates to an element for an apparatus for the determination of the partial oxygen pressure.

Such an apparatus is known (for example, form an article by H. Schmalzried in Zeitschrift fuer Elktochemie 66, 572–576 (1962)), in which the property of zirconium oxide is used that it has a reversible reaction with oxygen, in which the electric conductivity takes place by means of oxygen ions. The e.m.f. between a pair of electrodes which is provided on either side of the surface of a body consisting of $ZrO_2$ is proportional to the logarithm of the ratio of the partial oxygen pressures in the atmosphere which surrounds the two electrodes. This apparatus is not only suitable for the measurement of the partial oxygen pressure in a gas atmosphere, but also for doping small quantities of oxygen, when a certain e.m.f. is applied between the above-mentioned electrodes. The apparatus is suitable for measurements in a range of from $1-10^{15}$ atm. and is even sufficiently sensitive for some orders of magnitude below said value. The measuring accuracy and the adjusting rate are large.

In chemical technology the need exists for an apparatus which is not too complicated and with which the order of magnitude of a partial oxygen pressure can rapidly be established. The above-described apparatus has too small a measuring range for this purpose and is too complicated. It is an object of the invention to provide such an apparatus.

It is furthermore known (from an article by R. L. Blumenthal c.s. in "J. Phys. Chem. Solids" 27 643–654 (1966)) that nonstoichiometric titanium dioxide has an electric conductivity which is reversibly dependent upon the partial oxygen pressure. At temperatures above 1,000° C., the adjusting rate is large enough that bodies might be used consisting of $TiO_2$ for determining the oxygen content in gas mixtures by means of measurements of the electric conductivity of the bodies. In investigations performed to that end it has unfortunately been found that in the curve, which represents the electric conductivity as a function of the partial oxygen pressure, there is a minimum, for example, in the region from 1 and $10^{11}$ atm. $O_2$. This means that in this range there are a series of conductivity values which hold for two partial oxygen pressure values each.

From further investigations it has been found that the occurrence of the conductivity minimum was caused by the presence of P-conductivity causing impurities of titanium dioxide, for example, $Al^{+++}$, $Fe^+$, $Fe^{++}$, $Co^{+++}$ or $Ni^{+++}$. It has been found that it is possible, by the addition of compounds which contain metal ions which cause N-conductivity, to obtain a rectilinear or substantially rectilinear dependence of the logarithm of the conductivity, as a function of the logarithm of the partial oxygen pressure. For that purpose it is necessary that the concentration of the addition has a given value. This value can easily be found in a series of experiments. It should be noted that the function which describes the conductivity as a function of the partial oxygen pressure, is also dependent upon the temperature. The measuring temperature has consequently to be established before hand.

Overdoping of the compound which contains metal ions which cause N-conductivity involves that in the curve which represents the dependence of the conductivity on the partial oxygen pressure, a part occurs which extends parallel to the abscissa.

According to the invention, the element for determining partial oxygen pressures in gas mixtures by means of measurement of the conductivity and a calibrating curve, is characterized in that it consists of titanium dioxide to which such a quantity of a compound which contains metal ions which cause N-conductivity is added that the dependence of the logarithm of the conductivity as a function of the logarithm of the partial oxygen pressure, is rectilinear or substantially rectilinear without the occurrence of a minimum or a part which extends parallel to the abscissa.

An example of such a compound which contains metal ions which cause N-conductivity is niobium pentoxide.

In order that the invention may be readily carried into effect, an element for an apparatus for measuring partial oxygen pressures will now be described in greater detail with reference to a few Figures. Titanium dioxide powder was mixed with 0.05 and 0.2 mol percent of niobium pentoxide, respectively, compressed with a binder and sintered. The resulting ceramic bodies had dimensions of 15×5×0.8 mm., and an average grain diameter of from 30 to 50 $\mu$m. A sample without any addition was also manufactured.

FIG. 1 is a cross-sectional view of the measuring apparatus. The temperature was kept constant between 800° and 1000° C. at ±2° C. by means of a Pt/Pt–Rh thermoelement. The measurement was carried out in this apparatus by means of the conventional four point method to eliminate errors which occur in that the contact resistances and the current supplies have a finite value throughout the measuring range. The measurement is carried out with alternating voltage, because otherwise at high oxygen pressures, that is to say at high resistance of the samples to be measured, ion conductivity occurs.

Figure 2:

The gas mixture is passed through the tube along the measuring element 3. The required temperature is adjusted by means of the heater element 2. The electric supply lines for the measurement of the conductivity are denoted by 4, and those for the thermoelements are denoted by 5. FIG. 2 is a plan view of the measuring probe.

For the determination of the calibration curve, oxygen-argon mixtures are used in the measuring range $1.10^{16}$ atoms $O_2$. The argon is of the most pure quality having an oxygen content of $1-2 \times 10^{14}$ percent. For the adjustment of low partial oxygen pressures $H_2+Ar$ (or $N_2$) $H_2O$ gas mixtures are used with which, according to the temperature, partial oxygen pressures between $10^{110}$ and $10^{121}$ atmosphere can be obtained. At the lowest oxygen pressures the gas mixture contains 190 torr. $H_2+570$ torr. $N_2+4.8$ torr. $H_2O$. In the case of a further increase of the hydrogen pressure, the measuring range could be extended to even lower partial oxygen pressures. The partial oxygen pressures are calculated by means of the law of mass action.

Figure 3:
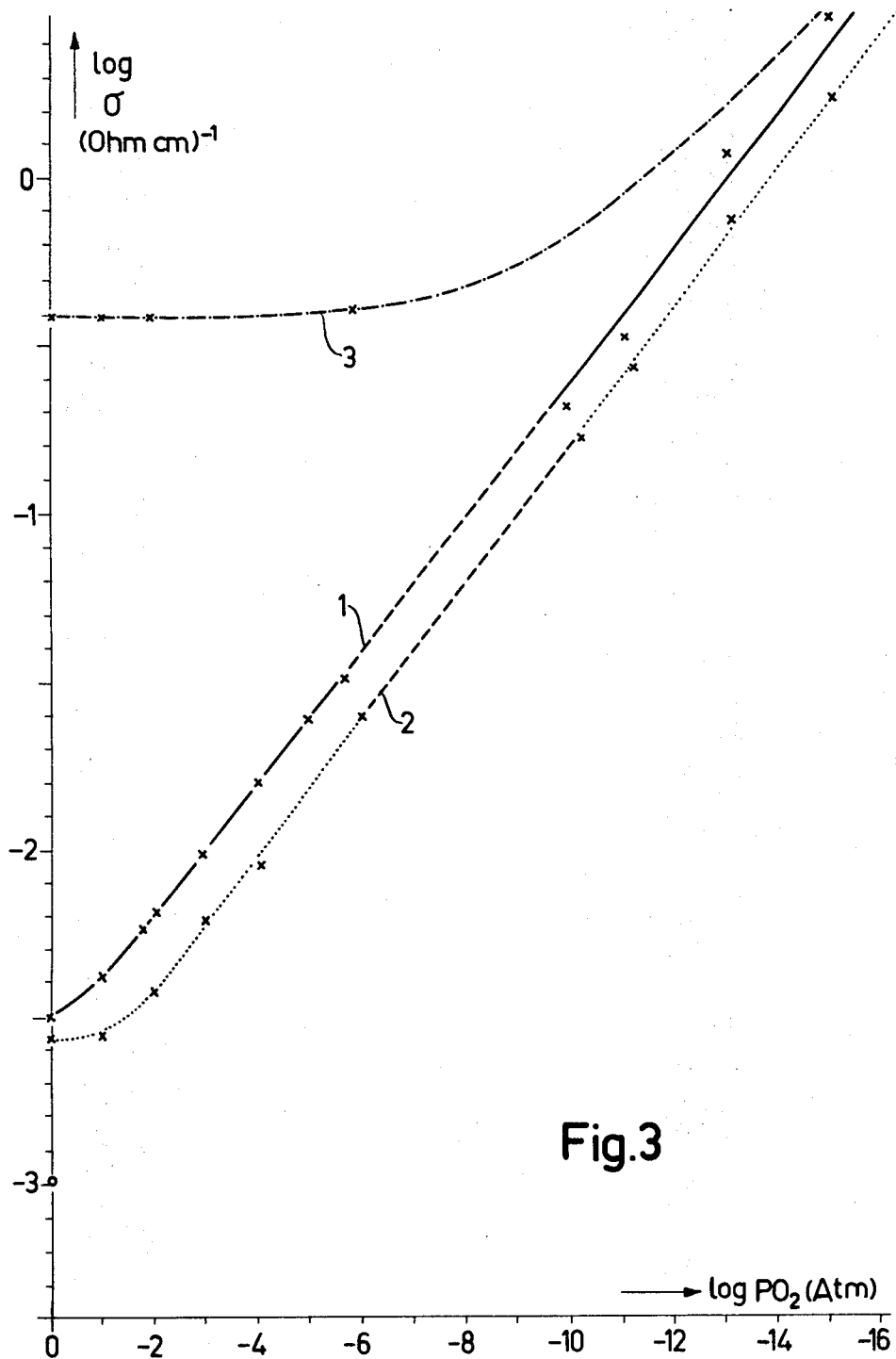

The measured results are summarized in FIG. 3. Curve 1 which is substantially rectilinear applies to the samples $TiO_2+0.05$ percent $Nb_2O_5$ at 1,000° C. Curve 2 applies to an element which consists of a commercial quality of $TiO_2$, likewise at 100° C., and curve 3 applies to an element which consists of $TiO_2+0.2$ percent $Nb_2O_5$ in which the $Nb_2O_5$ doping is too high. In the Figure the logarithm of the electrical conductivity is plotted against the logarithm of the partial oxygen pressure in the atmosphere.

With a commercially available milliohmmeter and a temperature adjustment of ±2° C. an overall error in the conductivity measurement of ±4 percent is estimated which is expressed in an error of ±20 percent in the oxygen determination.

I claim:

1. In an apparatus for the determination of partial oxygen pressures in a gas mixture by the measurement of the electrical conductivity of an element exposed to said gas mixture the improvement comprising employing as said element a titanium dioxide to which such a quantity of N-conductivity causing metal ions are added that the curve of the logarithm of the conductivity of the element as a function of the logarithm of the partial oxygen pressure is at least substantially rectilinear and wherein no minimum is present in said curve and no portion of said curve is parallel to the logarithm of the partial oxygen pressures.

2. The apparatus of claim 1 wherein the metal ions are pentavalent niobium ions.